United States Patent [19]
Matsumoto et al.

[11] Patent Number: 5,134,352
[45] Date of Patent: Jul. 28, 1992

[54] VEHICLE TURNING BEHAVIOR CONTROL SYSTEM

[75] Inventors: Shinji Matsumoto, Yokosuka; Hirotsugu Yamaguchi, Chigasaki; Sunao Hano; Hideaki Inoue, both of Yokosuka, all of Japan

[73] Assignee: Nissan Motor Co., Ltd., Yokohama, Japan

[21] Appl. No.: 678,078

[22] Filed: Apr. 2, 1991

[30] Foreign Application Priority Data

Apr. 16, 1990 [JP] Japan .................................. 2-97725

[51] Int. Cl.⁵ ............................................. B60T 8/64
[52] U.S. Cl. .................................. 318/587; 318/139; 318/563; 303/92; 303/100; 364/426.02
[58] Field of Search .................... 318/560-630, 318/138; 180/197, 140; 303/92, 96, 97, 100, 103, 106, 111, 119, 116; 364/424.05, 426.02; 280/6.12, 707

[56] References Cited

U.S. PATENT DOCUMENTS

| | | | |
|---|---|---|---|
| 4,593,955 | 6/1986 | Leiber | 303/106 |
| 4,759,590 | 7/1988 | Uchida et al. | 303/106 |
| 4,761,022 | 8/1988 | Ohashi et al. | 280/703 X |
| 4,783,126 | 11/1988 | Arikawa | 303/92 X |
| 4,793,662 | 12/1988 | Arikawa | 303/92 X |
| 4,809,181 | 2/1989 | Ito et al. | 303/100 X |
| 4,809,183 | 2/1989 | Eckert | 364/426.02 X |
| 4,852,009 | 7/1989 | Jonner et al. | 364/426.02 |
| 4,872,729 | 10/1989 | Arikawa | 303/92 |
| 4,881,785 | 11/1989 | Ushijima et al. | 180/197 X |
| 4,902,076 | 2/1990 | Ushijima et al. | 364/426.02 |
| 4,967,869 | 11/1990 | Nagaoka et al. | 180/244 |
| 4,998,593 | 3/1991 | Karnopp et al. | 180/140 |
| 5,015,041 | 5/1991 | Kuwana et al. | 303/100 X |
| 5,029,892 | 7/1991 | Miwa | 280/707 |

*Primary Examiner*—Paul Ip
*Attorney, Agent, or Firm*—Foley & Lardner

[57] ABSTRACT

A vehicle turning behavior control system is mounted in an automotive vehicle having an anti-skid braking system. The control system has an electronic control unit to which a signal representative of a vehicle turning condition is input. The control unit is arranged to establish a difference between braking forces applied respectively to inside and outside wheels (with respect to a vehicle turning direction) in accordance with the turning condition representative signal so as to develop a yaw moment between the inside and outside wheels to promote a turning of the vehicle. The control unit also functions to control the braking force applied to the outside wheel in accordance with the braking force applied to the inside wheel by the anti-skid system in a manner such that the former braking force changes in a similar pattern to the latter braking force.

11 Claims, 5 Drawing Sheets

| REGION \ ITEM | PRESS. INC./PRESS. MAIN.(msec) | |
|---|---|---|
| | FRONT OUTSIDE WHEEL | REAR INSIDE WHEEL |
| a | — | — |
| b | 5/20 | — |
| c | 5/30 | — |
| d | 5/40 | — |
| x | — | 5/100 |

VEHICLE TURNING BEHAVIOR CONTROL SYSTEM

BACKGROUND OF THE INVENTION

1. Field of the Invention

This invention relates to improvements in a vehicle turning behavior control system for obtaining a high vehicle front turning ability, and more particularly to such a vehicle turning behavior control system for a vehicle provided with an anti-skid braking system.

2. Description of the Prior Art

Hitherto a variety of vehicle turning behavior control systems have been proposed. One of them is disclosed, for example, in a Japanese Utility Model Provisional Publication No. 59-155264 in which a brake application timing for an outside wheel, with respect to a vehicle turning direction, is controlled to be retarded relative to a brake application timing for an inside wheel, thereby developing a difference in braking force between the inside and outside wheels. This provides an initial vehicle front turning ability to stabilize the turning of the vehicle. In addition, for the same purpose, it has also been proposed to positively decrease a braking force distribution to the outside wheel, with respect to the vehicle turning direction as compared with the inside wheel.

The above control methods can improve a vehicles front turning ability; however such a function to improve the turning ability is unavoidably impeded in the case of a vehicle provided with an anti-skid braking system. More specifically, in general, the anti-skid braking system is arranged to control brake hydraulic pressures for respective wheels in accordance with wheel speeds detected by wheel speed sensors. Thus, necessary braking forces are obtained and lateral forces without causing wheel lock-up which improves the braking performance of the vehicle.

However, in the case where the above-discussed control for improving the vehicle front turning ability is carried out in a vehicle provided with an anti-skid braking system, roll of the vehicle body and lateral load movement become greater, thereby quickening a slip increase of an inside wheel with respect to the vehicle turning direction during braking. As a result, an anti-skid braking control is applied to the inside wheel so that brake hydraulic pressure for the inside wheel is decreased. At this time, if the brake hydraulic pressure for the inside wheel is decreased as compared with that for the outside wheel, a setting mode of difference in braking forces between the inside and outside wheels is reversed relative to that required for improving the vehicle front turning ability. As a result, the vehicle front turning ability cannot be controlled under the anti-skid braking control in which brake hydraulic pressure control is made independently in left and right side wheels. Thus, it has been difficult to simultaneously effect both the vehicle front turning ability improving control and the anti-skid braking control. In view of this, it may be proposed to carry out a suitable braking force distribution to the brake hydraulic fluid (which has been reduced by the anti-skid braking control) for the inside wheel with respect to the vehicle turning direction, and further to prolong a pressure decreasing time of the brake hydraulic fluid for the outside wheel as compared with that for the inside wheel with respect to the vehicle turning direction. However, this results in braking force shortage.

SUMMARY OF THE INVENTION

It is an object of the present invention to provide an improved vehicle turning behavior control system for a vehicle provided with an anti-skid braking system, by which drawbacks encountered in conventional systems can be overcome.

Another object of the present invention is to provide an improved vehicle turning behavior control system for a vehicle provided with an anti-skid braking system, by which a vehicle front turning ability improving control is compatible with an anti-skid braking control without inviting a braking force shortage.

The vehicle turning behavior control system of the present invention is for a vehicle provided with an anti-skid braking system (a) as shown in FIG. 1. The control system is comprised of a first means (b) for detecting a vehicle turning condition. A device (c) for setting braking forces for wheels during vehicle turning is provided and includes a second means for making a difference between first and second braking forces which are applied respectively to first and second (inside and outside) wheels (d), (e), in accordance with the vehicle turning condition, so as to develop a yaw moment between the wheels to promote the turning of the vehicle. The first and second wheels are located respectively on the inside and outside with respect to a vehicle turning direction. Additionally, a third means is provided to control the second braking force applied to the second wheel in accordance with the first braking force applied to the first wheel in a manner that the second braking force changes in a similar pattern to the first braking force, when an anti-skid braking control by the anti-skid braking system is applied to the first wheel.

Accordingly, a vehicle front turning ability is effectively raised by virtue of a difference in braking force between the inside and outside wheels with respect to the vehicle turning direction, thereby effectively improving the vehicle turning behavior control. In addition, by virtue of the third means, even in case where the anti-skid control is effected to the inside wheel during the vehicle front turning ability improving control, the latter control is effectively carried out together with the former control, thereby preventing disturbance and instability in vehicle turning behavior due to a reversal in the setting mode of braking force between the inside and outside wheels with respect to the vehicle turning direction. Thus, the vehicle moving is greatly improved during vehicle turning.

DETAILED DESCRIPTION OF THE INVENTION

Figure 1:
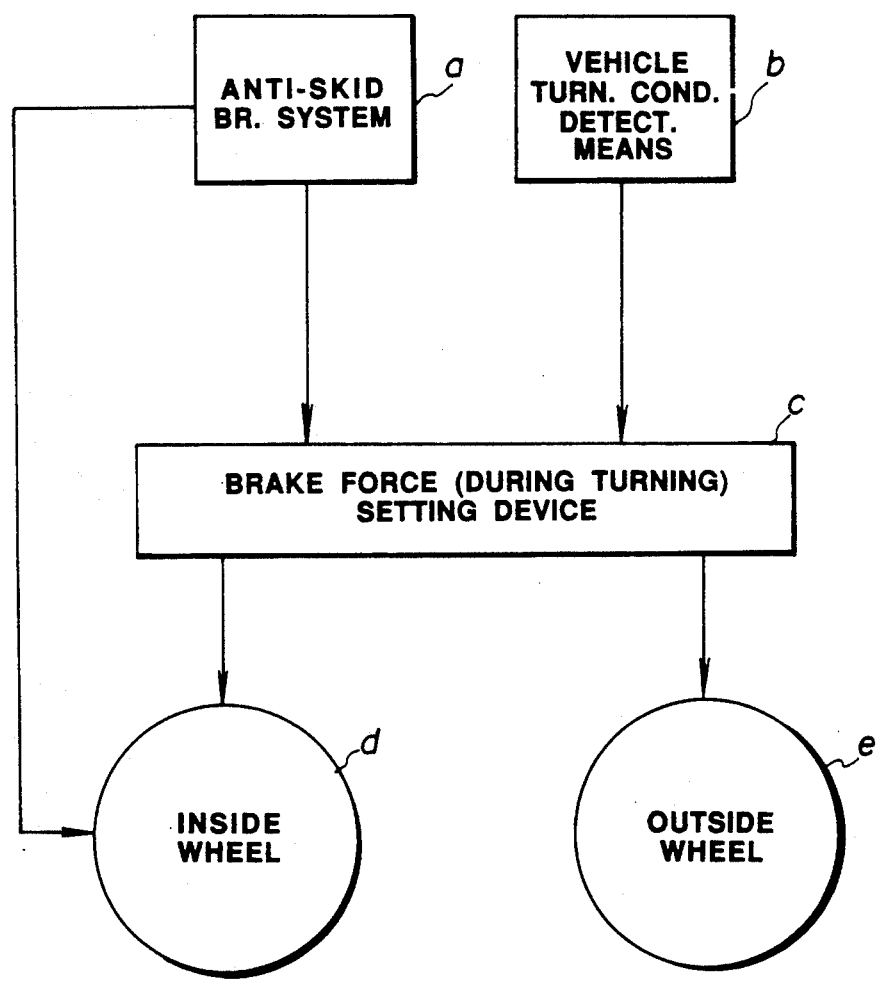
FIG. 1 is a diagrammatic illustration showing an idea of the present invention.

Referring now to FIG. 1, there is shown an embodiment of a vehicle turning behavior control system S according to the present invention. The vehicle turning behavior control system S is mounted on an automotive vehicle having front left and right side wheels 1L, 1R and rear left and right side wheels 2L, 2R. Each of the wheels 1L, 1R, 2L, 2R is provided with a known disc brake (not shown) forming part of a brake system (not identified). The disc brakes for the wheels 1L, 1R, 2L, 2R include wheel brake cylinders 3L, 3R, 4L, 4R, respectively. A brake pedal 5 is operatively connected to a brake master cylinder 6 which is adapted to simultaneously supply the same brake hydraulic pressure to both lines 7, 8 which are respectively for the front wheels 1L, 1R and for the rear wheels 2L, 2R upon depression of the brake pedal 5. The master cylinder hydraulic pressure in the line 7 is supplied through branched two sub-lines 7L, 7R to the wheel cylinders 3L, 3R to brake the front wheels 1L, 1R. The master cylinder hydraulic pressure in the line 8 is supplied through branched two sub-lines 8L, 8R to the wheel cylinders 4L, 4R to brake the rear wheels 2L, 2R. Thus, the brake system in this embodiment includes two separate hydraulically operated brake systems B1, B2 respectively for front wheels 1L, 1R and rear wheels 2L, 2R.

The sub-lines 7L, 7R, 8L, 8R include electromagnetic valves 11L, 11R, 12L, 12R, respectively, which are the same in structure and operation as each other. Each electromagnetic valve 11L, 11R, 12L, 12R has first, second and third positions which are shown respectively at the left side, at the center, and at the right side in the symbol of each electromagnetic valve in FIG. 2. In the first position of each electromagnetic valve, a fluid communication is established between the wheel cylinder 3L, 3R, 4L, 4R and the master cylinder 6 while a fluid communication is blocked between the wheel cylinder and a reservoir tank 13, 14 to increase the hydraulic pressure to be supplied to the wheel cylinder. In the second position of the same electromagnetic valve, a fluid communication of the wheel cylinder with both the master cylinder 6 and the reservoir tank 13, 14 is blocked to maintain the hydraulic pressure at a constant level. In the third position of the same electromagnetic valve, a fluid communication is blocked between the wheel cylinder and the master cylinder 6 while a fluid communication between the wheel cylinder and the reservoir tank 13, 14 is established to decrease the hydraulic pressure to be supplied to the wheel cylinder. Additionally, each electromagnetic valve is adapted to take the first postion when electric current $i_1$, $i_2$, $i_3$, $i_4$ for operating the electromagnetic valve is 0A, the second position when the electric current is 2A, and the third position when the electric current is 4A, respectively. The electromagnetic valve operating currents $i_1$, $i_2$, $i_3$, $i_4$ are supplied from an electronic control unit (ECU) 21 to the respective electromagnetic valves 11L, 11R, 12L, 12R. According $\omega_1$, the first, second and third positions of each electromagnetic valve are referred to as "pressure increasing position", "pressure maintaining position", and "pressure decreasing position", respectively.

The reservoir tanks 13, 14 are provided to temporarily store the hydraulic pressure from the wheel cylinder in order to smoothen a hydraulic pressure decrease in the wheel cylinder. The reservoir tanks 13, 14 are fluidly connected respectively to the suction ports (not shown) of the pumps 16, 17 which are driven by a common motor 15. Each pump 16, 17 is adapted to send hydraulic fluid temporarily stored in the reservoir tank 13, 14 during the pressure decrease in the wheel cylinder, to an accumulator 19, 20, so that the hydraulic fluid is recycled to the lines 7, 8.

The electromagnetic valve operating currents $i_1$, $i_2$, $i_3$, $i_4$ are separately decided by the electronic control unit 21 which is supplied with a variety of signals such as a signal from wheel speed sensor 22, 23, 24, 25, a signal from a lateral acceleration sensor (lateral G sensor) 26, a signal from a steering angle sensor 27, and a signal (B) from a brake switch 28. The wheel speed sensors 22, 23, 24, 25 are adapted to detect the revolution speeds (numbers of revolution per unit time) $\omega_1$, $\omega_2$, $\omega_3$, $\omega_4$ of the wheels 1L, 1R, 2L, 2R, respectively. The lateral acceleration sensor 26 is adapted to detect a lateral acceleration $Y_g$ of the vehicle. The steering angle sensor 27 is adapted to detect a steering angle or rotational angle (operated angular amount) $\theta$ of a steering wheel (not shown). The brake switch 28 is adapted to detect a condition in which the brake pedal is depressed thereby to generate the signal (B).

In this embodiment, the electronic control unit 21 functions to carry out the anti-skid braking control and includes a control means for decreasing a braking force distribution to at least one of front and rear wheels on the outside with respect to the vehicle turning direction in accordance with a vehicle turning condition. The electronic control unit further includes a regulating means for regulating a brake hydraulic pressure for the outside wheel, with respect to the vehicle turning direction, in accordance with a brake hydraulic pressure for the inside wheel, so that the former braking hydraulic pressure is changed in a similar pattern to the latter brake hydraulic pressure, when the anti-skid braking control is applied to the inside wheel.

In the above-discussed vehicle turning behavior control system, a normal braking or an anti-skid braking control is carried out when the brake is applied, as discussed below. The anti-skid braking control is performed in the case wherein there is a possibility of creating a wheel lock-up, in which case the hydraulic pressure being supplied to the wheel cylinder is decreased to avoid the wheel lock-up and is subsequently increased. Such brakings will be discussed hereinafter.

Figure 2:
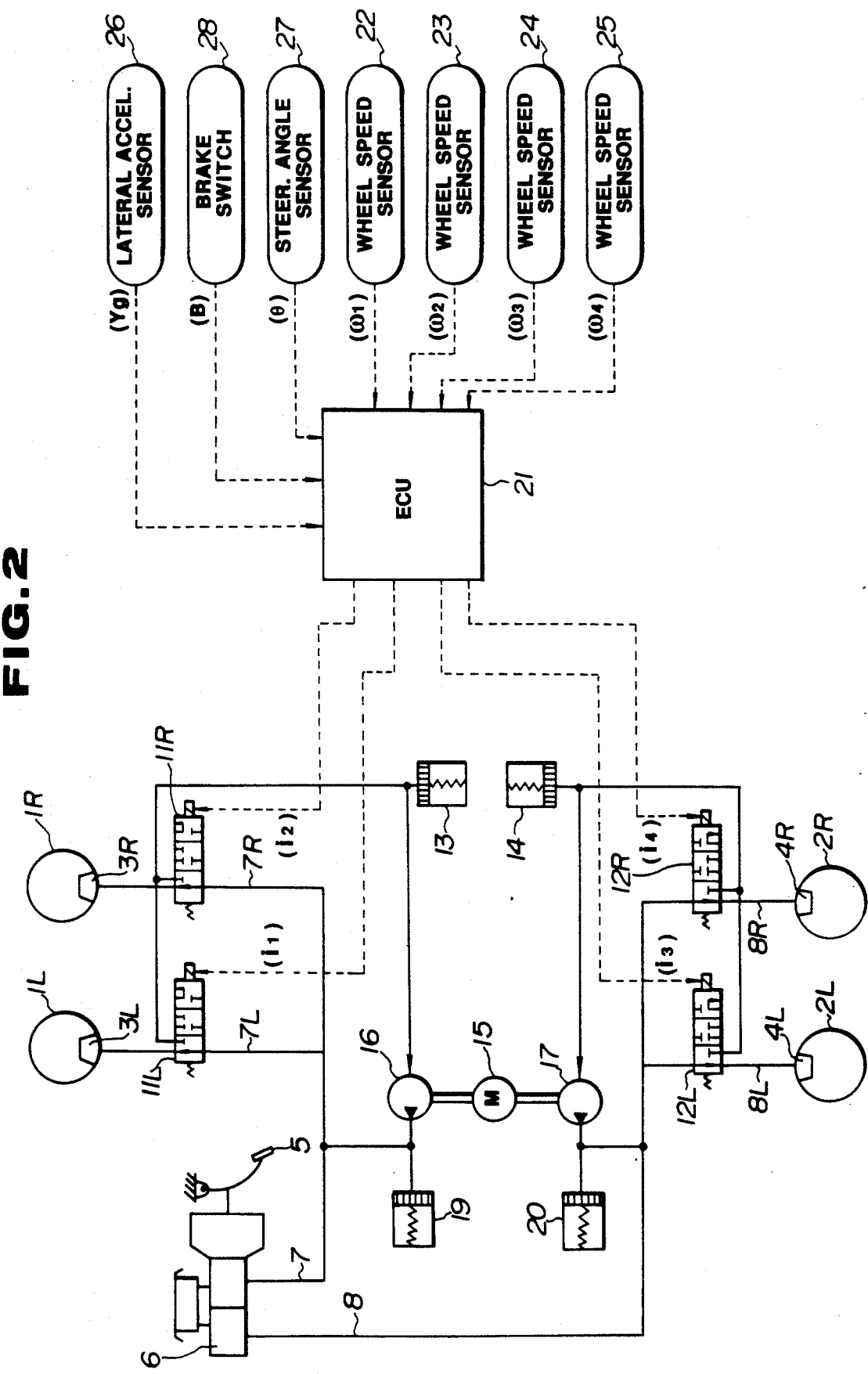
FIG. 2 is a schematic illustration of an embodiment of a vehicle turning behavior control system in accordance with the present invention.

When the brake pedal 5 is depressed by a driver to apply the, the electronic control circuit 21 causes the electromagnetic valves 11L, 11R, 12L, 12R to be switched OFF or supplied with 0A of the operating currents $i_1$, $i_2$, $i_3$, $i_4$ so that the electromagnetic valves are maintained in their respective positions as shown in FIG. 2, in the case where no possibility of wheel lock-up is created in the wheels 1L, 1R, 2L, 2R. Accordingly, upon depression of the brake pedal 5, the same hydraulic pressure (the master cylinder hydraulic pressure) is simultaneously supplied from the master cylinder 6 to the both lines 7, 8 respectively, for the front and rear wheels. This hydraulic pressure is supplied through the sub-lines 7L, 7R (including the electromagnetic valves 11L, 11R) to the wheel cylinders 3L, 3R, and through the sub-lines 8L, 8R (including the electromagnetic valves 12L, 12R) to the wheel cylinders 4L, 4R, thus braking the wheels 1L, 1R, 2L, 2R individually. This is the normal braking mode.

During such operation of the vehicle turning behavior control system, the revolution speed of each wheel 1L, 1R, 2L, 2R is being detected to calculate a pseudo vehicle speed (V) by a known calculation method. Then, a braking slip ratio is calculated according to the pseudo vehicle speed (V), and another pseudo vehicle speed or wheel speed for each wheel, which will be discussed in detail after subsequently. The electronic control unit 21 makes a decision of a wheel lock-up for each wheel 1L, 1R, 2L, 2R. When the wheel lock-up tends to occur in the particular wheels, the electromagnetic valves for the particular wheels are operated to take the pressure maintaining position under the action of the electronic control unit 21, thereby preventing the brake hydraulic pressure in the corresponding wheel cylinders from increasing. In case the wheel lock-up occurs regardless of such a control, the electronic control unit 21 is operated to put the corresponding electromagnetic valves into their pressure decreasing position, thereby lowering the hydraulic pressure to be applied to the corresponding wheel cylinders, thus preventing wheel lock-up in the corrsponding wheels. When the corresponding wheels again begin to rotate under the above control, the electronic control unit 21 is operated to put the corresponding electromagnetic valves into their pressure maintaining positions thereby preventing the hydraulic pressure in the corresponding wheel cylinders from a further decrease. Then, as the rotation of the corresponding wheels are restored, the electronic control unit 21 is operated to put the corresponding electromagnetic valves into their pressure increasing positions so as to increase the hydraulic pressure in the corresponding wheel cylinders to approach the pressure in the master cylinder 6. Under repitition of such an anti-skid control cycle, the brake hydraulic pressures for the respective wheels 1L, 1R, 2L, 2R can be controlled to values for accomplishing optimum (best braking) performance, thus achieving a normal anti-skid braking control.

Figure 3:
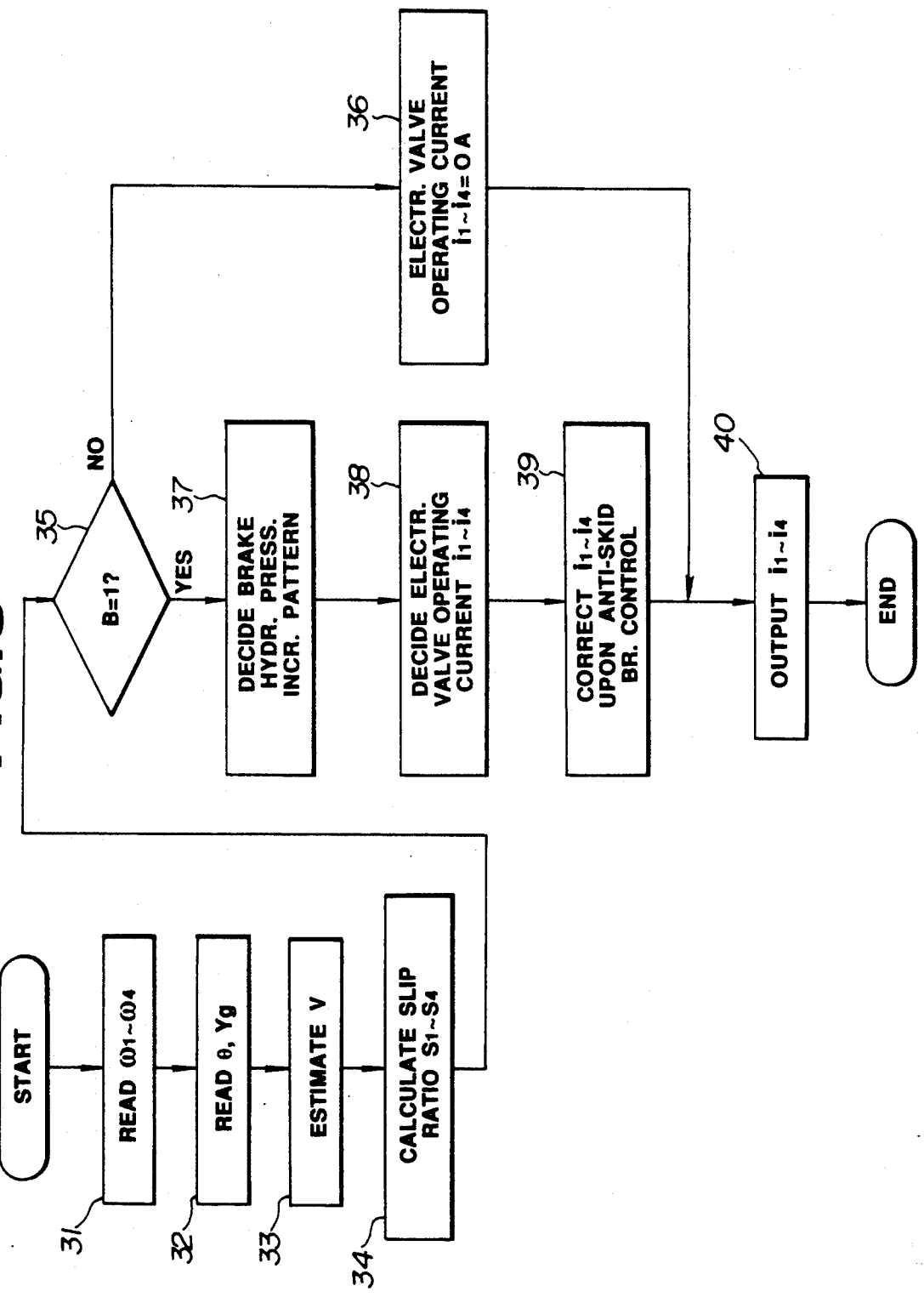
FIG. 3 is a flowchart of a control program of an electronic control unit used in the control system of FIG. 2.

An example of the vehicle turning behavior control executed by the electronic control unit 21, will be discussed with reference to a flowchart of a control program, shown in FIG. 3, in which the control depends on input information such as the steering angle detected by the steering angle sensor 27.

First at steps 31 and 32 in the flowchart, the revolution speed $\omega_1$, $\omega_2$, $\omega_3$, $\omega_4$ of each wheel 1L, 1R, 2L, 2R detected by the wheel speed sensor 22, 23, 24, 25, the steering angle (steering wheel rotational angle) detected by the steering angle sensor 27 and the lateral acceleration $Y_g$ detected by the lateral acceleration sensor 26 are read in. At a step 33, a pseudo vehicle speed V is estimated. In this embodiment, on the basis of the fact that the revolution speed of the front wheels 1L, 1R (not driven) generally corresponds to the vehicle speed V, the vehicle speed V is determined in this embodiment by the following equation:

$$V = Ra(\omega_1 + \omega_2)/2$$

where Ra is the radius of the front wheels 1L, 1R.

Subsequently, at a step 34, the slip ratios $S_1$, $S_2$, $S_3$, $S_4$ of the repsective wheels 1L, 1R, 2L, 2R are calculated. These slip ratios are used for the anti-skid braking control as discussed above. For example, the slip ratio $S_1$ of the front left wheel 1L is calculated upon using the above-mentioned estimated vehicle speed V by the following equation:

$$S_1 = (V - V_{1A})/V$$

where $V_{1A} = Ra \times \omega_1$. As a result of this calculation, if $S_1 = 0$ (i.e., $V_{1A} = V$), the front left wheel 1L is turning with no slip. If $S_1 = 1$ (i.e., $V_{1A} = 0$, and accordingly $\omega_1 = 0$), the front left wheel 1L is locked up. The slip ratios $S_2$, $S_3$, $S_4$ of the other wheels 1R, 2L, 2R are similarly calculated.

At a step 35, ON or OFF states of the brake switch 28 is judged according to the brake signal being 1 or not, thereby checking as to whether the driver depresses the brake pedal or not. If the driver does not depress the brake pedal (i.e., the brake switch 28 is in the OFF state), the vehicle turning behavior control according to the present invention is not required and therefore all the electromagnetic valve operating currents $i_1$, $i_2$, $i_3$, $i_4$ are made 0 at a step 36 and output at a step 40.

On the contrary, in case where the brake pedal is judged to be depressed (i.e., the brake switch 28 is in the OFF state or B=1), the vehicle turning behavior control according to the present invention will be performed as discussed hereinafter.

Figure 6:
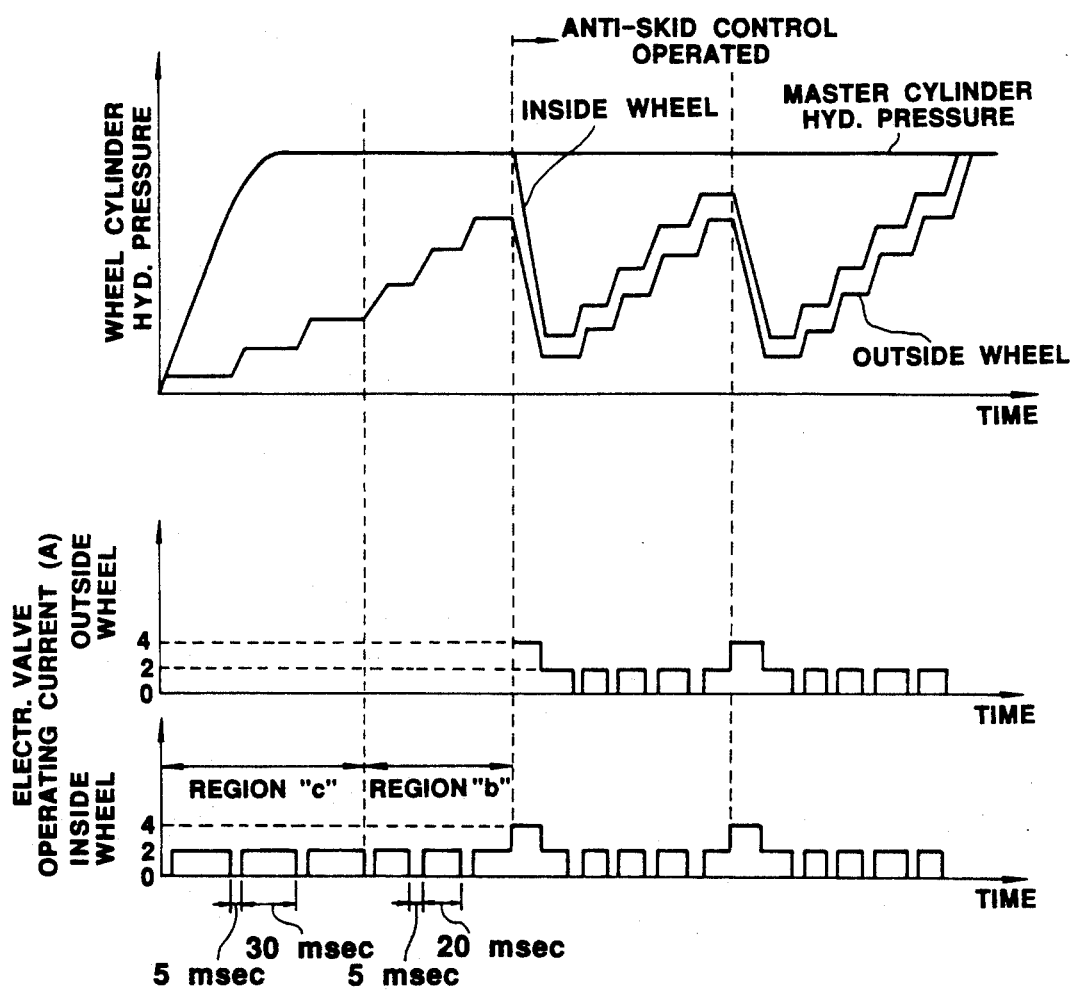
FIG. 6 is a time chart showing a control manner according to the control system of FIG. 2 in terms of brake hydraulic pressure in wheel cylinders and electromagnetic valve operating currents for the inside and outside wheels with respect to a vehicle turning direction.

At a step 37, decision or selection of a pattern for increasing the brake hydraulic pressure supplied to each wheel cylinder 3L, 3R, 4L, 4R is carried out. In this embodiment, a braking force difference required for improving a vehicle front turning ability is given between the inside and outside wheels of the front wheels 1L, 1R with respect to a vehicle turning direction. More specifically, the wheel cylinder hydraulic pressure for only the front wheel 1R (during a vehicle leftward turning) or 1L (during a vehicle rightward turning) located on the outside with respect to the vehicle turning direction is controlled according to a manner of the present invention in order to improve the vehicle front turning ability. Accordingly, such a control cannot be carried out on the wheel cylinder hydraulic pressure for the front wheel 1L (during the vehicle leftward turning) or 1R (during the vehicle rightward turning) located on the inside with respect to the vehicle turning direction, and for the two rear wheels 2L, 2R, in which the braking force (the wheel cylinder hydraulic pressure) of these three wheels depend on a depression force to the brake pedal except for a predetermined condition (corrsponding to a x region in FIGS. 4 and 5) discussed hereinafter. Thus, the pressure increasing pattern of the wheel cylinder hydraulic pressure for these wheels is the same as that during the normal braking. In other words, the wheel cylinder hydraulic pressure for these wheels is the same as the hydraulic pressure in the master cylinder 6 as illustrated in FIG. 6.

On the contrary, the braking force for the front outside wheel 1R (during the vehicle leftward turning) or 1L (during the vehicle rightward turning) is reduced relative to that for the front inside wheel 1L or 1R to obtain the difference in braking force between the front outside and inside wheels thereby to generate a yaw moment. For this purpose, the vehicle turning condition is checked, and then a suitable hydraulic pressure increasing pattern is set for the front outside wheel in accordance with the checked vehicle turning condition. In this embodiment, such a control is performed in accordance with the lateral acceleration $Y_g$ from the lateral acceleration sensor 26, the steering angle $\theta$ from the steering angle sensor 27 and the vehicle speed V determined in the manner discussed above.

Figures 4, 5:
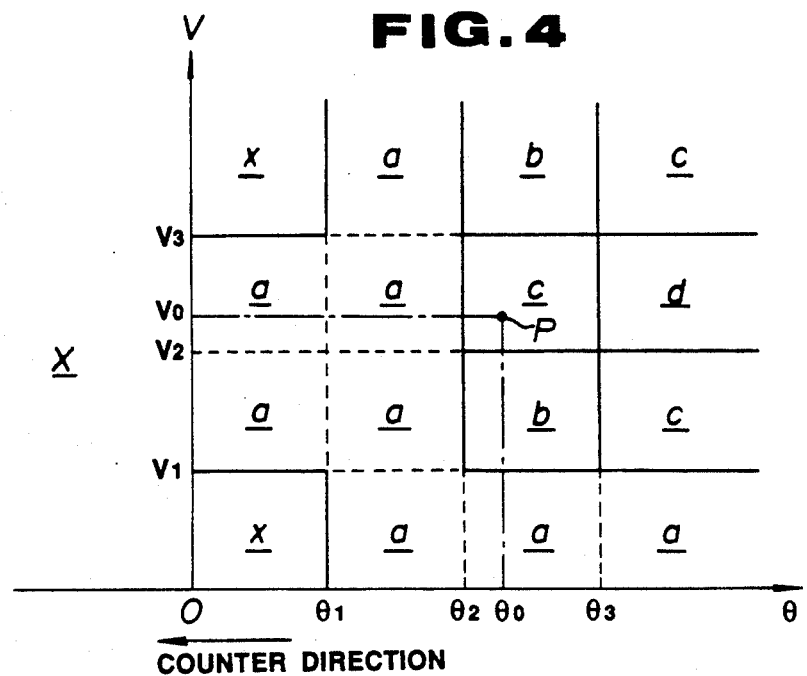
FIG. 4 is a control map to be used to decide a brake hydraulic pressure increasing pattern for a vehicle front turning ability improving control by the electronic control unit.
FIG. 5 is a data table showing the brake hydraulic pressure increasing pattern in terms of pressure increasing and maintaining time.

More specifically, the control is carried out according to a control map whose one example is shown in FIG. 4, in case that the detected lateral accelration exceeds a preset value $Y_{gL}$ (i.e., $Y_g > Y_{gL}$). In the map of FIG. 4, the steering angle $\theta$ is divided into four sections by three points $\theta_1$, $\theta_2$, $\theta_3$ while the vehicle speed V is divided into four sections by three points $V_1$, $V_2$, $V_3$, thereby forming sixteen regions a, b, c, d, x. In this regard, a decision is made such that the vehicle turning condition is in any region. Thus, the pressure increasing pattern for the hydraulic pressure to be supplied to the wheel cylinder 3L, 3R, 4L, 4R is decided according to the lateral acceleration $Y_g$, the steering angle $\theta$, and the vehicle speed V and according to the the control map as shown in FIG. 4.

According to the decided region of the control map of FIG. 4, data of the time of increasing pressure and the time of maintaining pressure are retrieved from a table one example of which is shown in FIG. 5. The table of FIG. 5 shows a cycle including a pressure increasing time (msec) within which 0A of the electromagnetic valve operating current $i_2$ is supplied to the electromagnetic valve 11R for the front outside wheel with respect to the vehicle turning direction to put the valve 11R into its pressure increasing position during the vehicle leftward turing, or 0A of the current $i_1$ is supplied to the electromagnetic valve 11L for the front outside wheel with respect to the vehicle turning direction to put the valve 11L into its pressure increasing potition during the vehicle rightward turning; and a pressure maintaining time (msec) within which 2A of the electromagnetic valve operating current $i_2$ is supplied to the same electromagnetic valve to put the electromagnetic valve into its pressure maintaining position, for each judged region (vehicle turning condition) a, b, c, d, x in the control map of FIG. 4. This cycle is repeated. Such a control sets a degree at which a braking force decreasing is applied to the front outside wheel with respect to the vehicle turning direction in order to make a vehicle turning behavior correction to the vehicle turning direction. Here, it will be understood that as the rate of the pressure maintaining time becomes large, the braking force of the corresponding wheel is largely restricted thereby to develop a greater yaw moment in the vehicle turning direction.

Here, discussion will be made on a vehicle turning condition represented at a point P (in FIG. 4) where the vehicle speed is $V_0$ while the steering angle is $\theta_0$. This condition corresponds to the region c in FIG. 4. When braking is made during the vehicle leftward turning for example, under a condition where the vehicle speed is $V_0$, the steering angle $\theta_0$, and the lateral acceleration is $Y_{g0}$, first the lateral acclration is judged to be larger than the preset value $Y_{gL}$ or not. In the case where $Y_{g0} > Y_{gL}$, the pressure increasing pattern of the region c in FIG. 4 is employed, in which the electromagnetic valve operating current $i_2$ to the electromagnetic valve 11R for the front outside wheel (the front rightside wheel 1R in this case) is controlled in the pattern shown in FIG. 6 repeating a cycle in which the operating current $i_2$ is made at 0A for 5 msec and then made at 2A for 30 msec. Accordingly, in this case, the hydraulic pressure in the wheel cylinder 3R is controlled in the manner of pressure increasing time/pressure maintaining time=5/30 (msec) and therefore gradually increased.

However, at this time, such a pressure increasing and maintaining control is not made on the hydraulic pressure (brake hydraulic pressure) in the wheel cylinder 3L for the front wheel 1L as the inside wheel with respect to the vehicle turning direction, and therefore the corresponding electromagnetic valve 11L is always maintained at the pressure increasing position. As a result, the hydraulic pressure in the wheel cylinder 3L becomes equal to that in the master cylinder 6. In the case of control of FIG. 6, when the vehicle turning condition is shifted to that of the region b in the process where the wheel cylinder hydraulic pressure is controlled in the above increasing and maintaining pattern corresponding to the region c, the pattern is changed into that corresponding to the region b in which the pressure maintaining time is 20 msec. Thus, the control manner is also changed corresponding to the shifted vehicle turning condition. Thus, the braking force applied to the front wheel located on the inside with respect to the vehicle turning direction is reduced according to the regions b, c, d, thereby developing the yaw moment to assist the turning of the vehicle.

In the data of FIG. 5, the pressure increasing and maintaining control is not carried out in the regions a and x, so that the electromagentic valve corresponding to the front outside wheel with respect to the vehicle turning direction is always kept at the pressure increasing position so as not to make the difference in braking force between the front inside and outside wheels. This is represented as a symbol "—" in the table of FIG. 5. In this embodiment, when the lateral accelration $Y_g$ is not higher than the preset value $Y_{gL}$, the vehicle turning assistance (according to the control map of FIG. 4) under the action of the yaw moment is not made. In this case, even the electromagnetic valve corresponding to the front wheel located on the outside with respect to the vehicle turning direction is always in the pressure increasing position regardless of the values of the vehicle speed V and the steering angle $\theta$.

Furthermore, as shown in the table of FIG. 5, in case that the vehicle turning condition corresponds to the region x, a pressure increasing pattern of pressure increasing/pressure maintaining=5/100 (msec) is set for the rear wheel 2L (during the vehicle leftward turning) or 2R (during the vehicle leftward turning) located on the inside with respect to the vehicle turning direction. Accordingly, in this case, when braking is applied during the vehicle turning, the braking forces to be applied respectively to the front left and right side wheels 1L, 1R and the rear wheel located on the outside with respect to the vehicle turning direction depend on the depression force to the brake pedal so that the hydraulic pressure in the corresponding wheel cylinders becomes at the same level as that in the master cylinder 6, whereas only the hydraulic pressure in the wheel cylinder corresponding to the rear wheel located on the inside with respect to the vehicle turning direction is controlled to be decreased. This is for the purpose of obtaining a lateral force of the rear wheel of the vehicle thereby to stabilize the vehicle in case that the steering operation is in a counter direction in which the steering wheel is rotated to decrease the steering angle $\theta$, in which the braking force at the braking during the vehicle turing is utilized thereby positively stabilizing the vehicle so as to achieve prevention of a vehicle spin.

Thus, at a step 38, the electromagnetic valve operating current is provisionally decided in accordance with the decision of the pressure increasing, maintaining and decreasing patterns decided in the step 37.

Subsequently, at a step 39, a correction control is made to the electromagnetic valve operating current in accordance with the anti-skid braking control. The processing in this step will be discussed hereinafter.

This correction control at step 39 is summarized as follows: When an anti-skid braking control is performed for the wheel located on the inside with respect to the vehicle turning direction during the control of the hydraulic pressure (braking pressure) in the wheel cylinder for the wheel located on the outside with respect to the vehicle turning direction, to thereby improve the vehicle front turning ability during braking of the vehicle, the hydraulic pressure in the wheel cylinder for the wheel located on the outside with respect to the vehicle turning direction is controlled in accordance with the hydraulic pressure in the wheel cylinder for the wheel located on the inside with respect to the vehicle turning direction under a control in which the electromagnetic valve operating current $i_j$ (j=1, 2, 3 and/or 4) for the electromagnetic valve corresponding to the outside wheel is changed.

Even in the case where a control is carried out to decrease a braking force distribution to the wheel located on the outside with respect to the vehicle turning direction as indicated at an earlier period of the control in FIG. 6, the correction control cannot be executed until the anti-skid braking control is started. More specifically, in this embodiment, the vehicle front turning ability improving control is made between the front left and right side wheels. Accordingly, a judgement as to whether the anti-skid braking control is carried out or not is made only for the inside wheel with respect to the vehicle turning direction. When the anti-skid braking control is judged to have not yet been performed as a result of watching the inside wheel, the electromagentic valve operating current $i_2$ or $i_1$ corresponding to the front wheel 1R (during the vehicle leftward turning) or 1L (during the vehicle rightward turning) located on the outside with respect to the vehicle turning direction is reset at the level provisionally decided in the step 38 and output to the corresponding electromagnetic valve thereby to execute the step 40 so as to complete this control program. Accordingly, in this case, the vehicle front turning ability improving control is suitably accomplished, so that the braking force of the front wheel located on the inside with respect to the vehicle turning direction becomes at a level corresponding to the brake pedal depression force, whereas the braking force of the front wheel located on the outside with respect to the vehicle turning direction is lowered in level as compared with the level corresponding to the brake pedal depression force as shown in FIG. 6. As a result, turning of the vehicle is promoted upon receiving the yaw moment in the vehicle turning direction, thereby improving the vehicle front turning ability during vehicle turning.

In the case where the anti-skid braking control has been implemented in the above control process, as indicated at a latter period of the control in FIG. 6, a correction is made on the electromagnetic valve operating current $i_2$ or $i_1$ corresponding to the front wheel 1R or 1L located on the outside with respect to the vehicle turning direction. More specifically, when the anti-skid braking control (the first pressure maintaining or pressure decreasing) has been initiated for the front inside wheel, during the operation of the vehicle front turning ability improving control in which the braking force to the front outside wheel is reduced, the electromagnetic valve operating current $i_2$ or $i_1$ is changed so as to control an increase or decrease in the hydraulic pressure in the wheel cylinder of the front wheel located on the outside with respect to the vehicle turning direction in the same pattern as the hydraulic presssure in the wheel cylinder of the front wheel located on the inside with respect to the vehicle turning direction. In this control, the wheel cylinder hydraulic pressure for the front outside wheel is maintained lower than that for the front inside wheel as shown in FIG. 6

The corrected electromagnetic valve operating current $i_2$ or $i_1$ is output together with other electromagnetic valve operating currents at step 40.

As discussed above, even when the anti-skid braking control has been effected on the front wheel located on the inside with respect to the vehicle turning direction during execution of the brake force control between the front inside and outside wheels to promote the vehicle turning, the braking force to the front wheel located on the outside with respect to the vehicle turning direction can be suitably controlled in accordance with the braking force to the front wheel located on the inside with respect to the vehicle turning direction, thereby effecting simultaneously both the anti-skid braking control, and the vehicle front turning ability improving control. In the case where the anti-skid braking control is effected independently on each of the left and right side wheels, the braking hydraulic pressure decrease by the anti-skid braking control which causes a difference in braking force between the inside and outside wheels to be reversed under the influence of the vehicle front turning ability improving control and disturbs the vehicle turning behavior, can be prevented by the invention thereby stabilizing the vehicle turning behavior avoiding an excessive braking force shortage.

While the vehicle front turning ability improving control has been shown and described as being executed by using the control map shown in FIG. 4 when $Y_g$ (lateral acceleration)>$Y_{gL}$, it will be understood that the control map may be changed in response to a change in the lateral acceleration $Y_g$. Additionally, although the vehicle front turning ability improving control has been described to be carried out only for the front wheels, it will be understood that it may be carried out for the rear wheels, or for both the front and rear wheels. Furthermore, detection of the vehicle turning condition may be made by sensing only one of the turning angle, the vehicle speed, the lateral acceleration and a yaw rate (or angular velocity of a rotation of the vehicle about a vertical axis passing through the center of gravity of the vehicle), or by sensing a combination of at least two of them.

What is claimed is:

1. An apparatus comprising:
a vehicle having first and second wheels connected thereto;
means for detecting a vehicle turning condition;
means, responsive to said detecting means, for applying different first and second braking forces to said first and second wheels, respectively, said first and second wheels being located on the inside and the outside, respectively, with respect to a turning direction of said vehicle, such that a yaw moment between said first and second wheels is created thereby improving the turning of said vehicle;

an anti-skid braking system creating and applying a braking force pattern to said first wheel, such that the value of said first braking force changes;

means for changing the value of said second braking force by applying said braking force pattern to said second wheel concurrent with the application of said braking force pattern.

2. An apparatus comprising:

a vehicle having first and second wheels connected thereto;

means for detecting a vehicle turning condition and outputting a first signal indicative of said condition;

means, responsive to said first signal, for applying different first and second braking forces to said first and second wheels, respectively, said first and second wheels being located on the inside and the outside, respectively, with respect to the turning direction of said vehicle, such that a yaw moment between said first and second wheels is created thereby improving the turning of said vehicle;

means for detecting an application of said anti-skid braking system to said first wheel and generating a second signal indicative of said application, said anti-skid braking system applying a first braking force pattern to said first wheel such that the value of said first braking force changes;

means, responsive to said second signal, for changing the value of said second braking force such that said braking force changes in a similar pattern as said first braking force pattern.

3. A vehicle turning behavior control system as claimed in claim 2, wherein said turning condition detecting means includes at least one of means for detecting a steering angle and generating a third signal representing the angle, means for detecting a vehicle speed and generating a fourth signal representing the speed, means for detecting a lateral acceleration and generating a fifth signal representing the acceleration, and means for detecting a yaw rate and generating a sixth signal representing the rate, and said vehicle turning condition is decided in response to at least one of the third, fourth, fifth and sixth signals.

4. A vehicle turning behavior control system as claimed in claim 2, wherein said first and second wheels are generally coaxially arranged.

5. A vehicle turning behavior control system as claimed in claim 4, wherein said first and second wheels are opposite to each other with respect to a longitudinal axis of the vehicle.

6. A vehicle turning behavior control system as claimed in claim 2, wherein said vehicle turning condition detecting means includes means for deciding said vehicle turning condition based on a steering angle and a vehicle speed when a lateral acceleration exceeds a predetermined level.

7. A vehicle turning behavior control system as claimed in claim 2, wherein said applying means includes means for determining a second braking force pattern and means for changing said second braking force in accordance with said braking force changing pattern.

8. A vehicle turning behavior control system as claimed in claim 7, wherein said second braking force controlling means includes means for changing the second braking force pattern to be the same as the first braking force pattern in response to said second signal.

9. A vehicle turning behavior control system as claimed in claim 3, wherein said vehicle speed detecting means includes means for representing said vehicle speed as a product of a rotational speed and a radius of one of said wheels.

10. An apparatus comprising:

a vehicle having first and second wheels connected thereto;

means for detecting a vehicle turning condition;

means, responsive to said detecting means, for applying different first and second braking forces to said first and second wheels, respectively, said first and second wheels being located on opposite sides, respectively, with respect to a turning direction of said vehicle, such that a yaw moment between said first and second wheels is created thereby improving the turning of said vehicle;

an anti-skid braking system creating and applying a braking force pattern to said first wheel, such that the value of said first braking force changes; and means for changing the value of said second braking force pattern to said second wheel concurrent with the application of said braking force pattern.

11. A vehicle turning behavior control system for a vehicle provided with an anti-skid braking system, said control system comprising:

means for detecting a vehicle turning condition;

means for making a difference between first and second braking forces which are applied respectively to first and second wheels in accordance with the vehicle turning condition so as to control a yaw moment between the wheels, said first and second wheels being located respectively on opposite sides with respect to a vehicle turning direction; and means for controlling the second braking force applied to the second wheel in accordance with the first braking force applied to the first wheel so that the second braking force changes in a similar pattern to the first braking force when an anti-skid braking control by the anti-skid braking system is applied to the first wheel.

* * * * *